INVENTOR.
AL-G BARNES
BY William J Weller
ATTORNEY

United States Patent Office 3,339,403
Patented Sept. 5, 1967

3,339,403
NON-DESTRUCTIVE THICKNESS MEASURING
DEVICE
Al-G Barnes, Ponca City, Okla., assignor to Continental Oil Company, Ponca City, Okla., a corporation of Delaware
Filed Sept. 3, 1963, Ser. No. 306,068
4 Claims. (Cl. 73—67.9)

This invention relates generally to improvements in testing devices, and more particularly, but not by way of limitation, to improvements in devices for non-destructively measuring the thickness dimension of an object.

It is known in the art of measuring to provide devices for measuring the thickness of material where only one surface is available. This condition arises when measuring the wall thickness of pipe, storage tanks, ship's hulls, and the like. Among the methods heretofore devised for measuring the thickness under these conditions, the most effective have involved ultrasonic techniques for the non-destructive gauging and inspecting of materials. Two basically different ultrasonic systems have heretofore been proposed, i.e., the resonant system, which theoretically at least, measures the fundamental or harmonic frequency of the part in the thickness mode and the non-resonant system which depends upon the use of ultrasonic pulse echo ranging. Both of these ultrasonic systems, as heretofore employed, have limitations that have prevented their widespread use. A specific example of such a limitation is the errors caused by changes in coupling between the probe or transducer and the object to be tested. These errors are particularly pronounced when a transducer known in the art as a "bubble probe" is used. A common "bubble probe" includes a transducer which is coupled to an object to be tested through a suitable column of water.

The presently available ultrasonic testing systems which are sufficiently accurate to meet the standards of industry are not easily portable because they are too heavy and cumbersome to be easily moved about. This is a serious problem because frequently the device must be used in close quarters where it is relatively difficult for an operator of the device to bring it to the necessary position. Resonance type equipment is currently available with a high degree of portability but is lacking in accuracy. Equipment utilizing the pulse echot principle is also commercially available, but is limited by its size and weight. As an example, various vessels and piping used in a petroleum refinery must be periodically checked to determine the degree to which corrosion and other factors have affected the thickness dimension of the walls thereof. A record is kept of these periodic checks on dimensions so that the most appropriate time for replacing a particular vessel or piping may easily be determined. The portable thickness measuring devices presently available are not sufficiently accurate as to be entirely dependable for other than a relatively few uses.

It is apparent that a portable device is needed which non-destructively measures the thickness dimension of an object with a degree of accuracy sufficient to meet the standards of industry. This portable device should not only be accurate, but also should be able to indicate the thickness dimension of an object in a manner which will enable an operator of the device to quickly read the dimension, as opposed to a display on a cathode ray tube, for example. A preferred manner of presenting the dimension is a direct reading in tne form of a direct decimal output which would provide a faster more direct means of interpretation. A direct reading which may be obtained quickly would be of major importance in such non-destructive thickness measuring. Such equipment would enable measurements of hot steel pipes to be obtained in a matter of seconds rather than minutes. The problem of a long measurement time with hot pipes is especially acute when hot pipes are being measured with a "bubble probe." A vast quantity of steam is developed from the water column used with such a probe and makes testing decidedly uncomfortable for the operator of the equipment. At times this problem almost precludes the possibility of such readings being taken and even under the best circumstances tends to develop erroneous readings. This would enable the operator, if so desired, to quickly conduct a plurality of tests for verification of an initial reading or for obtaining a group of readings in order to obtain an average value. Also, it would be desirable for the device not to use atomic radiation for the testing operation as is used in many prior devices, thereby precluding posing a hazard to an operator thereof. It is also desirable for the device to be capable of measuring the thickness of an object under substantially any condition, and in particular, should be capable of measuring the wall thickness of pipe filled with a liquid.

The present invention contemplates an improved device for non-destructively measuring the thickness of a material and for substantially eliminating the errors caused by changes in coupling between a probe and a tested material. Errors which are introduced by changes in the coupling distance of the probe or transducer are precluded in the determination of the thickness dimension of a material.

The present invention contemplates a novel thickness measuring device utilizing ultrasonic pulses transmitted and reflected through a specimen being inspected. A transducer is either placed directly in contact with the surface of the specimen or is coupled to the specimen through a liquid column to transmit ultrasonic pulses into and through the specimen and to receive the ultrasonic pulses reflected from an opposite side of the specimen. The reflected ultrasonic pulses are utilized by a control circuit to control the operation of a gating device which in turn controls the time of operation of a digital counter, such that the counter will indicate the travel time of an ultrasonic pulse through the specimen, and will hence indicate the thickness of the specimen. The digital counter is driven by a variable frequency generator, whereby the frequency of the count made by the counter can be correlated to the velocity of ultrasonic pulses through the material of the specimen being inspected, such that the counter may be made to read directly in inches for the convenience of the operator.

When the transducer can be placed in direct contact with the specimen being inspected, the control circuit may be constructed to open the counter gating device only between the second and third pulses in the output circuit of the transducer. This period of time will correspond to twice the travel time of an ultrasonic pulse through the specimen, and the action eliminates the effect of the pulse transmitted into the specimen by the transducer, such than an accurate indication of the thickness of the specimen will be indicated.

When the transducer is coupled to the specimen through a liquid column, as will normally be the case when inspecting hot pipes and vessels, the control circuit may be constructed to eliminate not only the effect of the pulse transmitted into the specimen by the transducer, but also eliminate the effect of the pulse reflected from the exposed surface of the specimen and open the counter gating device only during the time lapse between reflected ultrasonic pulses which have passed through the specimen, whereby the counter will indicate twice the travel time of an ultrasonic pulse through the specimen In an alternate embodiment which is useful when the transducer is coupled to the specimen through a liquid column, a second control circuit may be utilized to block the signal fed to a receiver connected to the transducer during the transmission of the pulse by the transducer through the specimen and for a period of time thereafter, to eliminate the effects of the transmitted ultrasonic pulse and the reflection of the ultrasonic pulse from the exposed surface of the specimen through the liquid column, if desired Accordingly, it is an object of this invention to provide an improved non-destructive thickness measuring device that is portable and which is sufficiently accurate to meet the standards of industry.

An object of this invention is to provide a novel non-destructive thickness measuring device which provides a direct decimal output.

An object of this invention is to provide a novel non-destructive thickness measuring device which utilizes pulses reflected from a pulse transmitted into a test specimen for determining the thickness dimension of the specimen.

Another object of this invention is to provide a novel thickness measuring device of the pulse echo type which uses a first reflected pulse to actuate a counting mechanism and a following reflected pulse to de-actuate the counting mechanism whereby the thickness dimension of a test specimen may be displayed as a direct decimal output.

Another object of this invention is to provide a non-destructive thickness measuring device which precludes errors in determining the thickness dimension of a specimen which are caused by changes in coupling between a transducer and the specimen.

Still another object of this invention is to provide a novel thickness measuring device which will indicate the thickness dimension of a test specimen directly in inches.

Another object of this invention is to provide a portable non-destructive thickness measuring device which quickly and accurately indicates the thickness dimension of a test specimen as a direct reading.

Another object of this invention is to provide a novel non-destructive thickness measuring device which does not present a hazard to an operator thereof.

Still another object of this invention is to provide an improved thickness measuring device which quickly and clearly indicates a thickness dimension of a specimen thereby enabling a plurality of readings to be easily taken in a short period of time.

A still further object of the invention is to provide a novel thickness measuring device which has a high sensitivity to small variations in the thickness dimension of a specimen.

Yet another object of this invention is to provide a thickness measuring device which accurately indicates the thickness dimension of a specimen under adverse conditions.

And another object of this invention is to provide an improved non-destructive thickness measuring device which may be also used to locate flaws or other discontinuities in a specimen.

Other objects and advantages of the invention will be evident from the following detailed description, when read in conjunction with the accompanying drawings, which illustrate the invention.

Figure 1:
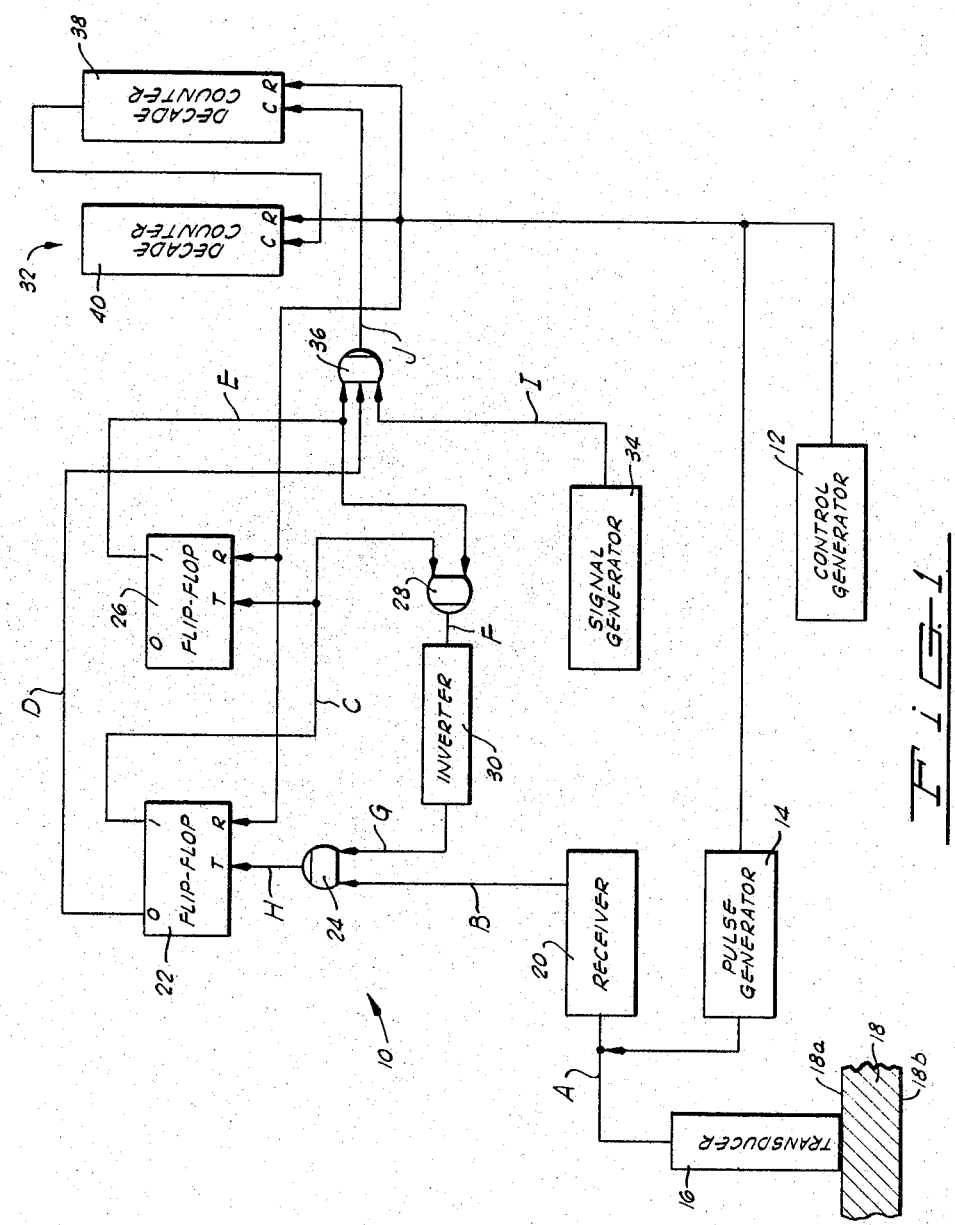
FIG. 1 is a block diagram of a preferred form of this invention when the transducer can be placed in direct contact with the specimen being measured.

Referring to the drawings in detail, and particularly FIG. 1, reference character 10 generally designates the preferred form of the thickness measuring device for a large portion of inspection operations which are encountered in the field. The device is controlled by a control generator or oscillator 12 which produces pulses at time spaced intervals of relatively short duration to provide a series of measurements at each inspection operation to enhance the accuracy of the device, as will be set forth below. A pulse generator 14 is connected to and energized by the control generator 12 to produce an electrical pulse for driving the transducer 16. The pulse produced by the generator 14 is, of course, of sufficient amplitude and duration to energize or drive the transducer 16, and may be, for example, a pulse of sixty volts having a duration of 0.2 microsecond when the specimen 18 being measured is steel. The transducer 16 is of any suitable type which will convert an electrical pulse to an ultrasonic pulse and which is responsive to an ultrasonic pulse for in turn producing an electrical pulse, such as a type ZS transducer produced by Branson Instruments, Inc., of Stamford, Conn.

In the form of the invention designated by reference character 10 and illustrated in FIG. 1, the transducer 16 is placed in direct contact with an exposed surface 18$a$ of the specimen 18 to be measured. An ultrasonic pulse produced by the transducer 16 will flow through the specimen 18 and be reflected back toward the transducer by the opposite face 18$b$ of the specimen. A portion of this reflected ultrasonic pulse will flow through the exposed surface 18$a$ of the specimen and energize the transducer 16. However, a portion of this reflected ultrasonic pulse is reflected back by the surface 18$a$ to the opposite surface 18$b$ and is there again reflected back toward the transducer 16. As before, this latter reflected pulse will energize the transducer 16 and a portion of the pulse will be reflected back through the specimen 18 again. This process is repeated, with each successive actuation of the transducer 16 being of reduced amplitude, until the reflected pulses are not of sufficient amplitude to energize the transducer 16.

Figure 2:
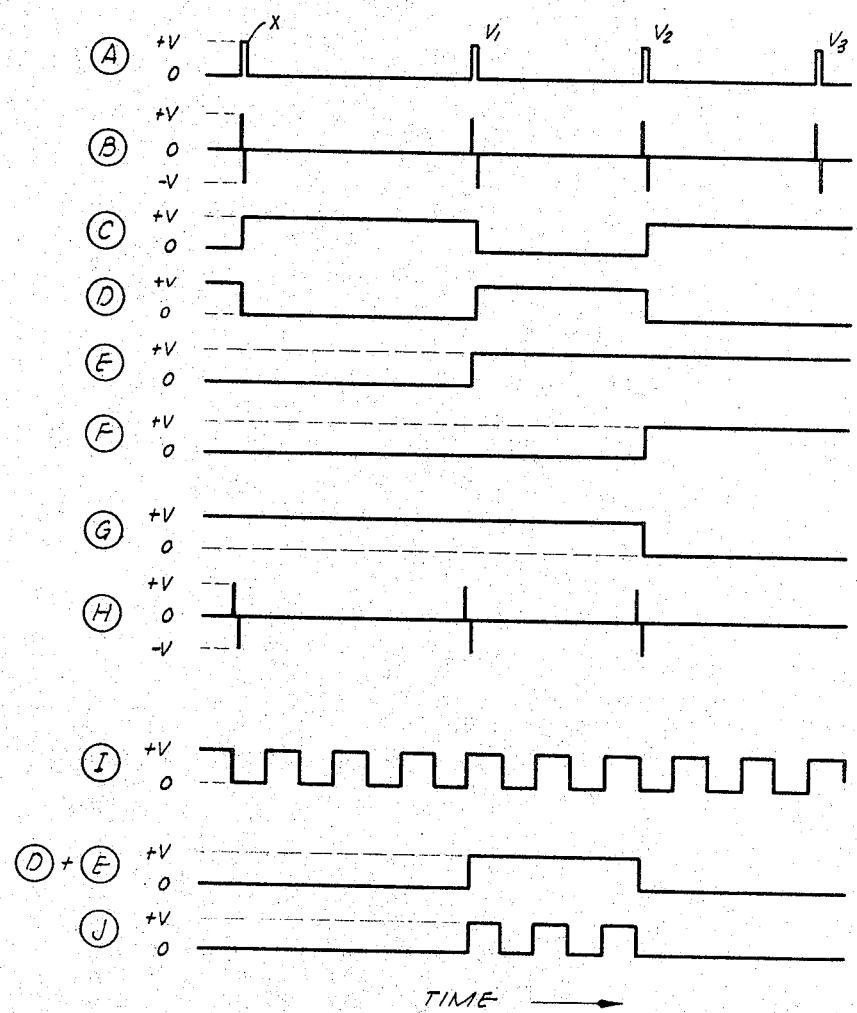
FIG. 2 illustrates the wave forms of signals which are generated in the circuit of FIG. 1. The letters which are employed to designate the various wave forms are also employed to indicate the portion of the circuit in FIG. 1 in which these wave forms appear.

As pointed out above, each time the transducer 16 is energized by an ultrasonic pulse, the transducer produces an electrical pulse. The wave form A of the electrical pulse transmitted to the transducer 16 and the electrical pulses produced by the transducer 16 is shown at the top of FIG. 2. It will be noted that the first pulse X represents the pulse transmitted by pulse generator 14 to energize the transducer 16, and the subsequent pulses $V_1$, $V_2$ and $V_3$ represent electrical pulses generated by the transducer 16 in response to reflected ultrasonic pulses which have been transmitted through the specimen 18. It may also be noted here that the time lapse between the reflected pulses, such as $V_1$ and $V_2$, represents twice the travel time of an ultrasonic pulse through the specimen 18 between the surfaces 18$a$ and 18$b$, providing, of course, that the specimen 18 does not have an internal defect which would also cause a reflection of ultrasonic pulses. When the material of the specimen 18 is steel, and is about one inch thick, the time between the occurrence of the reflected ultrasonic pulses, such as the time between pulses $V_1$ and $V_2$, is about four microseconds.

Both the pulse generator 14 and the transducer 16 are connected to a receiver 20. Thus, the input to the receiver 20 is the wave form A shown in FIG. 2 consisting of a series of pulses representing the times of occurrence of the transmitted pulse and the pulses reflected through the specimen 18. The receiver 20 is of a type to provide a differentiation of the input signal, such that the output of the receiver is in the form of wave form B shown in FIG. 2. In this wave form B, the negative spikes correspond to the trailing sides of the wave form pulses X, $V_1$, $V_2$ and $V_3$ and function to control the operation of a flip-flop circuit 22 through an AND gate 24 as will be described.

The flip-flop circuit 22 is of standard construction with the usual "0" and "1" output terminals, as well as a trigger input terminal, designated as T in the drawing, and a reset terminal designated R in the drawing. As it is well known in the art, the flip-flop circuit produces a positive signal at the "0" terminal and no signal at the "1" terminal when the flip-flop is reset or at an "at rest" condition, and the states of the "0" and "1" output terminals are reversed when a negative going signal is fed to the trigger terminal of the circuit. Thus, assuming that the AND gate 24 is open to the initial portion of the wave form B, the first negative going portion of wave form B triggers the flip-flop circuit 22 to make the "1" output of the circuit positive and the "0" output at zero volts, and the states of these outputs are reversed each time the circuit is triggered by a negative going signal. Under these conditions, the output "1" of the flip-flop circuit 22 is shown by wave form C in FIG. 2 and the "0" output of the circuit 22 is shown by wave form D.

The "1" output of the flip-flop circuit 22 is first connected to the trigger input of another flip-flop circuit 26 corresponding in all respects to the previously described flip-flop circuit 22. The "1" output of flip-flop circuit 22 is also connected to AND gate 28. Also, the "1" output of flip-flop circuit 26 is connected to the AND gate 28. This latter output has the wave form E as shown in FIG. 2. The gate 28 requires positive voltages on both of its inputs in order to provide an output signal. Thus, the wave forms C and E are impressed on the AND gate 28 to provide an output of this gate in the form of wave form F shown in FIG. 2.

A suitable inverter 30 is connected to the output side of the AND gate 28 and to the control side of the AND gate 24 for converting the wave form F to the wave form G shown in FIG. 2. In examining wave form G, it will be observed that the gate 24 will be open until the occurrence of the second reflected pulse $V_2$, such that the flip-flop circuit 22 is actuated by the pulses X, $V_1$ and $V_2$ by a wave form H shown in FIG. 2 which corresponds to wave form B down through and including reflected pulse $V_2$.

A digital type counter, generally designated by reference character 32, receives pulse type signals from a signal generator 34 through an AND gate 36 when the gate is open. The counter 32 is preferably in the form of at least two decade counters 38 and 40, each of which has a count input indicated by letter C on the drawing and a reset terminal indicated by letter R on the drawing. The decade counters 38 and 40 operate in the usual manner such that when the counter 38 has counted to ten, a pulse is transmitted to the decade counter 40 and the counter 38 starts counting again. Also, both of the decade counters 38 and 40 are preferably provided with suitable indicating lights to display the total count for visual readoff. Type 5243L solid state 20 mc. counters manufactured by Hewlett-Packard Co. of Palo Alto, Calif., have been used with success.

The gate 36 is controlled by the "0" output of flip-flop circuit 22 and the "1" output of flip-flop circuit 26 and, thus, by the wave forms D and E shown in FIG. 2 of the drawings. The gate 36 is closed until both of the control signals are positive. Thus, an examination of FIG. 2 shows that the gate 36 is closed until the occurrence of the first reflected pulse $V_1$, and the gate remains open only until the occurrence of the second reflected pulse $V_2$. As a result, signals are transmitted from the signal generator 34 to the counter 32 only during the time between the reflected pulses $V_1$ and $V_2$ which, as previously indicated, is twice the travel time of an ultrasonic pulse through the specimen 18.

The signal generator 34 produces a wave train of successive pulses which are fed to the counter 32 only when the gate 36 is open. Each pulse produced by the signal generator 34 provides a digital count in the counter 32. In other words, the counter 32 counts the number of pulses produced by the generator 34 when the gate 36 is open. The wave form I produced by the signal generator 34 is shown in FIG. 2, and that portion of this wave train which passes through the gate 36 is shown by wave form J in FIG. 2. Since the velocity of an ultrasonic pulse through the particular material being inspected is fixed and known, the output frequency of the signal generator 34 may be adjusted to provide a reading on the counter 32 directly in inches. Thus, when the specimen 18 is steel, the output frequency of the signal generator 34 may be made to be 11.6 megacycles to provide a direct reading on the counter 32 in hundredths of inches of thickness for the specimen 18.

The basic formula for determining the desired freqency of the signal generator 34 is determined by: $vt=s$ where $v$ is the velocity of the ultrasonic pulse through the specimen in inches per second, $t$ is the travel time of the ultrasonic pulse twice through the thickness of the specimen in seconds and $s$ is twice the thickness of the specimen in inches. And, since one cycle output of the generator 34 provides one count on the counter 32, the frequency (f) of generator 34 is equal to one cycle divided by $t$.

In a preferred embodiment the readout is in hundredths of an inch, and since the actual counting time is twice the travel time of a pulse through the specimen, the above formula becomes: $\frac{1}{2}t=0.01/v$. Hence, $f$ (frequency of generator 34) $=v./0.02$.

In as much as the device 10 is used for measuring the thickness of various types of materials, the signal generator 34 is preferably a variable frequency generator, whereby the output frequency of the signal generator may be adjusted in accordance with the above formulas upon using the device 10 for the various different materials.

As stated above, the control generator or oscillater 12 is utilized to repeat a thickness measurement several times, automatically, during each inspection operation to enhance the accuracy of the device. The control generator 12 is connected not only to the pulse generator 14, but also to the reset inputs of both of the flip-flop circuits 22 and 26 and the decade counters 38 and 40 to reset these circuits and devices simultaneously with the excitation of the pulse generator 14. The time lapse between each generation of a pulse by the control generator 12 must be sufficient for the counter 32 to complete its expected count in order that a complete thickness measurement will be made. This time lapse must be at least equal to four times the expected travel time of a pulse through the specimen 18 and preferably at intervals substantially longer than such travel time to assure that a complete count is made on the decade counters 38 and 40 during each measuring operation. In one form of this invention, a control generator has been used which fires or produces a pulse each fifteen milliseconds when the device was used to measure the thickness of a steel plate approximately one inch thick. As a result, the decade counters 38 and 40 were reset each fifteen milliseconds to provide, to the human eye, a continuous readout on the light indicators on the counters.

In summarizing the device 10 it will be observed that upon actuation of the pulse generator 14, the transducer 16 transmits an ultrasonic pulse through the surface 18a of the specimen 18 which is reflected back and forth through the specimen 18 between the surfaces 18a and 18b. Each time a reflected ultrasonic pulse reaches the surface 18a, a portion of the pulse goes through this surface and energizes the transducer 16 to transmit a series of time spaced pulses to the receiver 20. The electrical pulses representing reflected ultrasonic pulses are spaced in time equal to twice the travel time of an ultrasonic pulse through the specimen 18 between the surfaces 18a and 18b.

The control circuit comprising the flip-flop circuits 22 and 26, the gates 24 and 28 and the inverter 30 function in response to the electrical pulses transmitted to and from the transducer 16 retain the gate 36 closed until the first ultrasonic pulse is reflected through the specimen 18 and to again close the gate upon the occurrence of the second reflected ultrasonic pulse. The opening and closing of the gate 36 controls the time period during which the pulse type signals are transmitted from the signal generator 34 to the counter 32, such that the count produced by the counter 32 corresponds to twice the travel time of an ultrasonic pulse through the thickness of the specimen 18. With proper selection of the output frequency of the signal generator 34, the counter 32 reads directly in inches. When the device 10 is placed in operation, the control generator 12 provides a plurality of successive measurements of the thickness of the specimen 18 in rapid succession, such that, to the eye of the operator of the device, a continuous measurement is being made and yet the measurements are being successively made to assure an accurate determination of the thickness of the specimen.

FIG. 3 Embodiment

Figure 3:
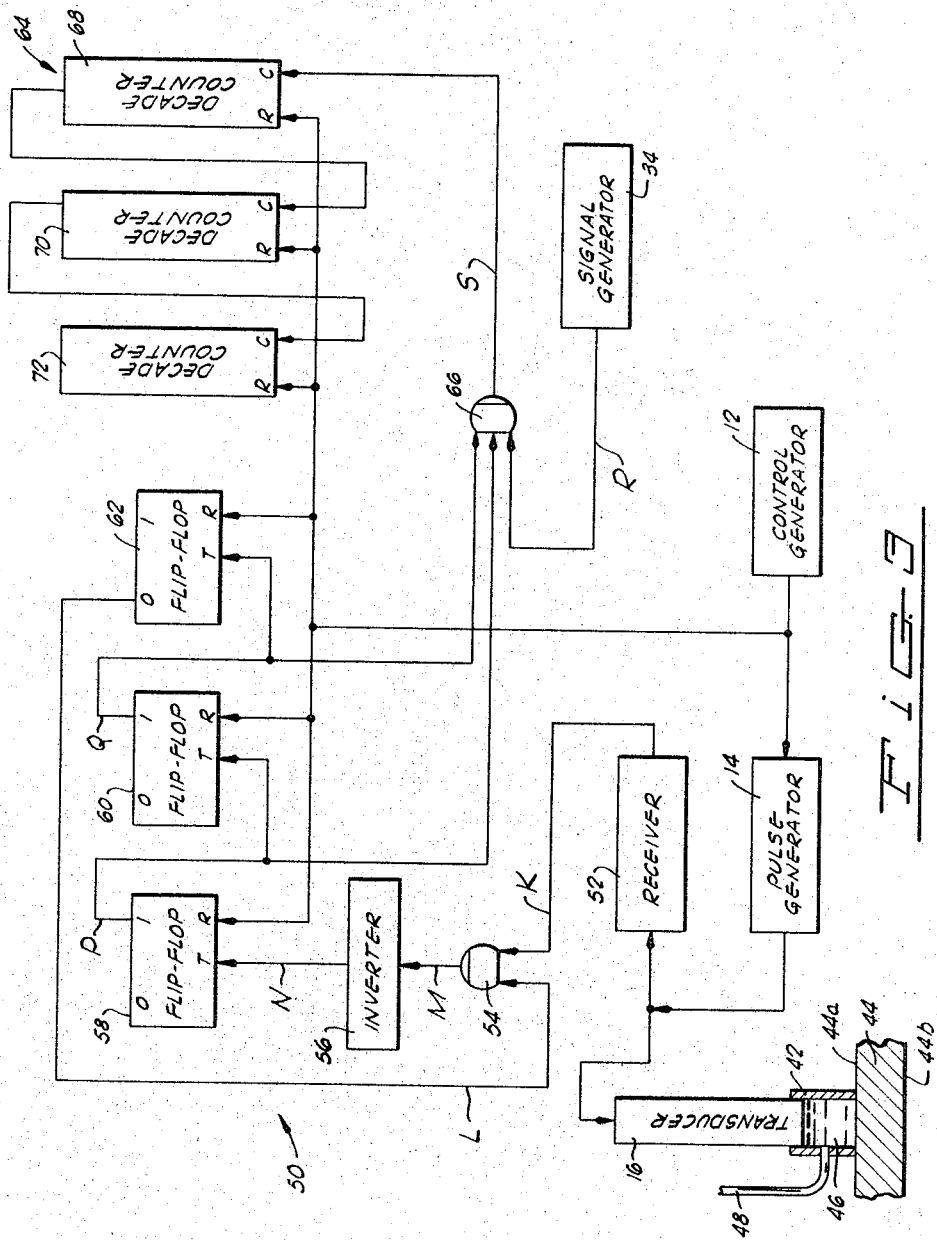
FIG. 3 is a block diagram of a preferred form of this invention when the transducer is coupled to the specimen through a column of liquid.

In many cases, such as when inspecting hot pipes, it is either inadvisable or undesirable to place the transducer directly in contact with the specimen being measured. In such cases, it is common practice to couple the transducer to the specimen through a liquid column as illustrated in FIG. 3. As shown, a relatively short section of tubing or pipe 42 of a size to slidingly receive the transducer 16 is placed in contact with the exposed surface 44a of the specimen 44 to be measured. The liquid column 46 is formed by filling the pipe 42 with water or oil through a suitable fill line 48. In practice, water or oil is substantially continuously poured in through the fill line 48 to maintain the column 46 between the transducer 16 and the specimen 44, since a portion of the liquid tends to leak out between the end of the pipe 42 and the surface 44a of the specimen 44 during a testing operation. With this arrangement, it will be apparent that when the transducer 16 generates an ultrasonic pulse, a portion of the pulse will first be reflected back upwardly through the column 46 from the surface 44a to provide a pulse response of the transducer 16 prior to the desired responses arising from reflections of ultrasonic pulses from the surface 44b of the specimen.

Figure 4:
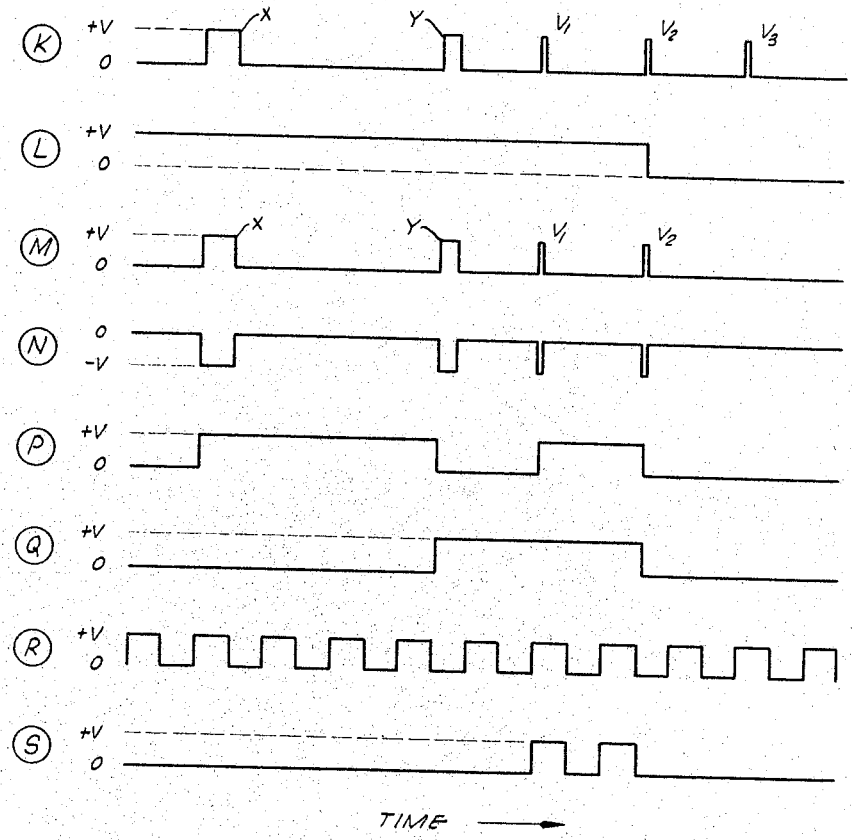
FIG. 4 is an illustration of the wave forms of signals which are generated in the circuit of FIG. 3. Here again the letters which are employed to designate the various wave are also employed to indicate the portions of the circuit in FIG. 3 in which these wave forms appear.

The device 50 shown in FIG. 3 is particularly suited for use in inspecting operations when it is necessary or desirable to couple the transducer 16 to the specimen 44 through the liquid column 46. This device utilizes a pulse generator 14 in the same manner as the previously described device 10 to energize the transducer 16 and create the ultrasonic pulse which travels downwardly through the liquid column 46 to and through the specimen 44. Both the pulse generator 14 and the transducer 16 are connected to a receiver 52 functioning as an amplifier for the electrical pulses generated by the transducer 16 in response to the reflected ultrasonic pulses. The wave form produced by the receiver 52 is indicated by the letter K an is shown at the top of FIG. 4. It will be observed that the first pulse X in the wave form K corresponds to the electrical pulse transmitted by the pulse generator 14 to the transducer 16 for generating the ultrasonic pulse. At some time later a pulse Y occurs in the wave form K representing the reflection of an ultrasonic pulse by the exposed surface 44a of the specimen 44 as indicated above. Pulse Y is spaced from the pulse X a time interval equal to the travel time of an ultrasonic pulse from the transducer 16 downwardly through the liquid column 46 to the surface 44a and then back upwardly through the liquid column to the transducer. It will be apparent that this time interval will depend upon the length of the liquid column 46 and may be, for example, one hundred microseconds.

A portion of the ultrasonic pulse generated by the transducer 16 penetrates the surface 44a of the specimen 44 and is subsequently reflected by the opposite surface 44b of the specimen. It will be apparent that a portion of this reflected pulse will penetrate the surface 44a and travel on upwardly through the column 46 to the transducer 16; whereas another portion of the pulse will be reflected back downwardly through the specimen 44. As a result, a series of pulses $V_1$, $V_2$ and $V_3$ will appear in the wave form K following the pulse Y representing the times of occurrence of the reflected ultrasonic pulses. It may also be noted that since each of the reflected ultrasonic pulses travels through the liquid column 46, the time interval between the pulse Y and the first reflected pulse $V_1$, and the time interval between each pair of successive reflected pulses is equal to the travel time of an ultrasonic pulse through twice the thickness of the specimen 44. It should further be noted that the wave form K represents the output of the receiver 52, since the pulses fed to the receiver will be of irregular configuration and not square wave pulses as illustrated in wave form K. However, the receiver 52 functions to shape these pulses into substantially square pulses as represented in wave form K. Furthermore, it is the times of occurrence of the pulses which is important in operation of the device 50 and not the precise shape of the pulses.

The output of the receiver 52 is transmitted through an AND gate 54 and an inverter 56 to a flip-flop circuit 58 when the gate 54 is open, as will be described below. The flip-flop circuit 58 is of the same construction as the flip-flop circuits 22 and 26 utilized in the device 10 previously described. It will also be noted that two additional flip-flop circuits 60 and 62 are provided in the device 50. The flip-flop circuits 58, 60 and 62 are interconnected with the "1" output of flip-flop circuit 58 being connected to the triggers input of flip-flop circuit 60, and the "1" output of flip-flop circuit 60 being connected to the trigger input of flip-flop circuit 62.

Assuming the AND gate 54 is open during the initial portion of the wave form K, the output of the gate will be in the form of the wave form M as shown in FIG. 4. It will be observed that the wave form M corresponds to the wave form K by the inclusion of the pulses X, Y, $V_1$, and $V_2$. The inverter 56 functions to invert the wave from M into the wave form N as also illustrated in FIG. 4. The wave form N is transmitted to the trigger input of the flip-flop circuit 58, such that the "1" output of this circuit is made positive upon the occurrence of the transmitted pulse X and remains positive until the occurrence of the initially reflected ultrasonic pulse Y and shown by the wave form P in FIG. 4. It will be observed that the wave form P remains at zero volts until the occurrence of the reflection or pulse $V_1$ and then goes positive until the occurrence of the next reflected pulse $V_2$.

As indicated above, the wave form P controls the flip-flop circuit 60 by being transmitted to the trigger input of the circuit. As a result, the "1" output of the flip-flop circuit 60 corresponds to the wave form Q shown in FIG. 4. It will there be noted that the wave form Q stays at zero volts until the occurrence of the pulse Y and then goes positive and remains positive until the time corresponding to the occurrence of the pulse $V_2$ since the wave form P does not go negative until this time. Thus, the wave form Q is positive for a time interval to the time between the pulse Y and the reflected pulse $V_2$; whereas the pulse P (during this same period) is positive only between the times of occurrence of the pulses $V_1$ and $V_2$.

The "0" output of the flip-flop circuit 62 is transmitted to the control terminal of the AND gate 54 and is illustrated as the wave form L in FIG. 4. It will be observed that since the input to the flip-flop 62 does not go negative until the time of occurrence of the pulse $V_2$, the "0" output of the circuit 62 will remain positive until this time to retain the gate 54 open. However, the gate 54 is closed at the time of occurrence of the pulse $V_2$ to block any further output of the receiver 52 from the flip-flop circuits.

A signal generator 34, corresponding to the signal generator 34 described in connection with the device 10, is utilized to transmit a wave train of successive pulses to a digital type counter 64 through an AND gate 66 when the gate is open. The gate 66 is connected to and controlled by the "1" outputs of both the flip-flop circuits 58 and 60. Thus, the gate 66 is controlled by the combination of the wave forms P and Q illustrated in FIG. 4, and, since both of these control signals or wave forms must be positive in order to open the gate 66, an examination of FIG. 4 shows that the gate will open only between the times of occurrence of the reflected pulses $V_1$ and $V_2$. As a result, the pulse wave train R produced by the signal generator 34 passes through the gate 66 only between the times of occurrence of the pulses $V_1$ and $V_2$, as represented by the wave form S in FIG. 4. It may also be noted that this time interval corresponds to twice the travel time of an ultrasonic pulse through the thickness of the specimen 44.

The counter 64 is preferably in the form of three decade counters 68, 70 and 72 interconnected in the usual fashion. When the specimen 44 being measured is less than ten inches thick, the frequency of the signal generator 34 is adjusted such that the decade counter 72 will indicate the tens digit; the decade counter 70 will indicate the tenths digit and the decade counter 68 will indicate the hundredths digit to provide a direct readout of the thickness measurement in hundredths of an inch. The decade counters 68, 70 and 72 are preferably the same type as the decade counters 38 and 40 previously described in connection with the device 10.

A control generator or oscillator 12, corresponding to the control generator 12 previously described in connection with the device 10, is connected to the pulse generator 14 and the reset inputs of all of the flip-flop circuits and decade counters to reset the flip-flop circuits and decade counters each time the pulse generator 14 is energized in a manner similar to the operation of the device 10. In this embodiment of the invention, the control generator 12 transmits a plurality of pulses during each operation of the device 50, with the time interval between successive pulses being at least as great as four times the travel time of an ultrasonic pulse through the thickness of the specimen 44, plus twice the travel time of an ultrasonic pulse through the column 46, in order that the decade counters 68, 70 and 72 will have sufficient time to make a complete count during the time interval between the occurrence of the pulses $V_1$ and $V_2$ illustrated in FIG. 4. In a commercial form, the control generator 12 may fire or produce a pulse each fifteen milliseconds, which is more than sufficient time to complete a measurement of the specimen 44 and yet is sufficiently fast that an observer will not be able to see a change in the indications of the decade counter 68, 70 and 72, unless the device gives a false reading during one or more of the measurements. If the device is operated properly, the observer will only see a continuous readout on the decade counters during a testing operation even though a plurality of individual measurements and individual counts are made.

In summarizing the operation of the device 50, it will be observed that the control circuit (comprising the flip-flop circuits 58, 60 and 62, the gate 54 and the inverter 56) will receive a series of pulses corresponding in time to the transmission of an ultrasonic pulse by the transducer 16, the receipt by the transducer of that portion of the ultrasonic pulse reflected from the surface 44a of the specimen, and then a series of pulses corresponding to the times of occurrence of ultrasonic pulses reflected from the lower face or surface 44b of the specimen. This control circuit is responsive to only those pulses occuring in time prior to the second pulse reflected from the surface 44b of the specimen to open the gate 66 only during the time interval between the first and second pulses reflected from the surface 44b of the specimen. The gate 66 is thus open only for a time interval corresponding to twice the travel time of an ultrasonic pulse through the thickness of the specimen, and the counter 64 is in operation only during this time interval during each measuring operation. With the proper selection of the output frequency for the signal generator 34, the counter 64 will provide a readout directly in hundredths of an inch for the thickness of the specimen being measured. As indicated above, the device 50 is particularly suited for testing specimens at high temperatures or the like requiring use of the liquid column 46 for coupling the transducer 16 to the specimen, although this form of the invention may be utilized when the transducer 16 can be placed in direct contact with the specimen being inspected.

Figure 5:
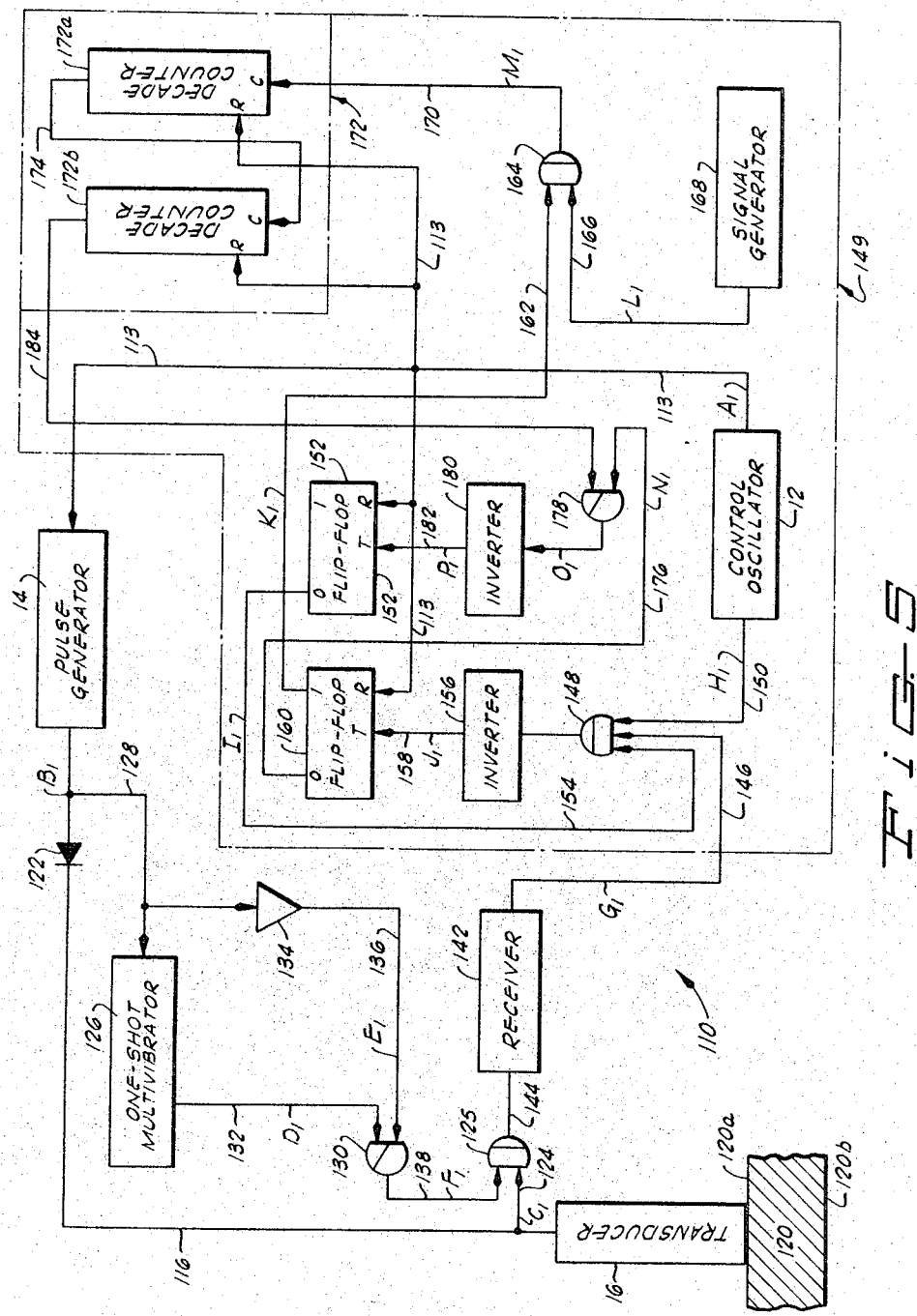
FIG. 5 is a block diagram of an alternate embodiment of this invention when the transducer is coupled to the specimen through a liquid column.

*FIG. 5 Embodiment*

Figure 6:
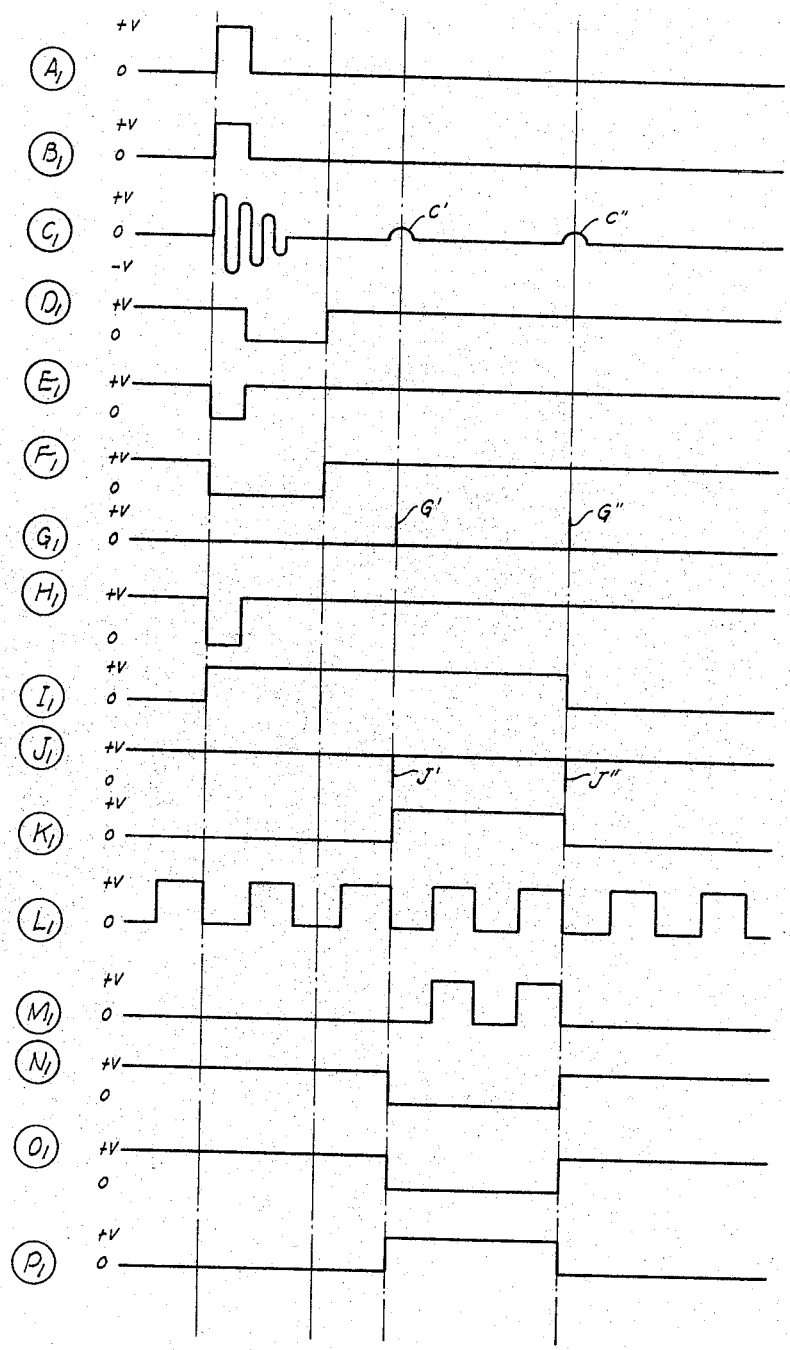
FIG. 6 is an illustration of the wave forms of signals which are generated in the circuit of FIG. 5. The letters which are employed to designate the various wave forms are employed to indicate the portions of the circuit in FIG. 5 in which these wave forms appear.

An alternate form of the invention is shown in FIG. 5. This device, generally designated by reference character 110, utilizes a pulse generator 14 which is triggered or excited by a pulse, having a wave form $A_1$ as shown in FIG. 6, that is received through a conductor 113 from a control oscillator 12. The pulse generator when triggered transmits an electrical pulse, having a wave form $B_1$ as shown in FIG. 6.

The electrical pulse $B_1$ is transmitted through a conductor 116 to a transducer 16 which converts an electrical pulse into a pulse of ultrasonic energy or which converts a pulse of ultrasonic energy into an electrical pulse or voltage signal. The transducer 16 is coupled to a specimen 120 to be tested, either directly, as shown, or through a liquid column in the manner previously described. It should be understood that in the event that the liquid column is employed, appropriate adjustments may be made to allow for delay time in pulse propagation.

The electrical pulse $B_1$ is converted or translated by the transducer 16 into a pulse of ultrasonic energy which is transmitted into the specimen 120 through an entering surface 120a. This ultrasonic pulse travels through the specimen 120 until it reaches a surface opposing the entering surface 120a, which may be the other side 120b of the specimen. It is obvious that a horizontal flaw or other discontinuity in the specimen 120 which would form an ultrasonic energy reflective plane would produce reflections of ultrasonic energy. Echos of the ultrasonic pulse are then reflected back towards the entering surface 120a. These echos or reflections are spaced apart and vary in amplitude by a gradually diminishing intensity. The echos or reflections which are of primary interest are the first and second reflections from the opposing side 120b of the specimen 120. These reflections are used to determine the thickness dimension of the specimen 120. For metal objects which have a thickness up to 1.5 inches it has been discovered that at least the first two internal reflections may be relied upon for determining the thickness dimension of the specimen 120, and in most instances any pair of reflections may be used to determine this dimension. Although in wave form $C_1$ only two reflections C' and C" are shown, it is to be understood that a train of gradually diminishing reflections result from the pulse transmitted into the specimen 120. These echos or pulses of ultrasonic energy are translated into electrical energy by the transducer 16 which generates electrical signals having a voltage amplitude proportional to the intensity of the pulses of ultrasonic energy. These voltage signals, shown in FIG. 6 as having wave form $C_1$, are precluded from entering the pulse generator 14 by a suitable blocking rectifier 122. The voltage signals $C_1$ flow through a conductor 124 to an AND gate 125.

The gate 125 is provided to preclude voltage signals from the transducer 16 from passing into the following portion of the circuit for a predetermined time after the generation of the electrical pulse $B_1$ by the pulse generator 14. It will be seen in wave form $C_1$ of FIG. 6 that the transducer 16 generates an oscillating voltage signal for a short period of time after being excited by the electrical pulse $B_1$. These oscillations, if not blocked from the following portion of the circuit, will cause the testing device 110 to yield spurious responses and to indicate an inaccurate thickness dimension. In the particular embodiment of the invention shown, this blocking means comprises a one-shot multivibrator 126 which is connected to the pulse generator 14 through a suitable conductor 128. The output of the multi-vibrator 126 is an electrical signal, shown by wave form $D_1$ in FIG. 6, which is supplied to an adding circuit 130 through a suitable conductor 132. The electrical pulse $B_1$ is also supplied through the conductor 128 to a suitable amplifier 134 which inverts the pulse $B_1$ to produce an electrical signal, shown by wave form $E_1$ in FIG. 6. The electrical signal $E_1$ of the amplifier 134 is transmitted through a suitable conductor 136 to the adding circuit 130 which adds the electrical signals $D_1$ and $E_1$ to produce an electrical signal having a wave form $F_1$, as shown in FIG. 6. The electrical signal $F_1$ is then transmitted through a suitable conductor 138 to the gate 125.

The gate 125 requires that a positive voltage signal be received through both conductors 124 and 138 in order that a signal may be passed therethrough. Referring to FIG. 6, it will be seen that the electrical signal $F_1$, which is the resultant signal of signals $D_1$ and $E_1$, goes from a positive voltage value to zero and remains at zero for a predetermined period of time before returning to a positive value of voltage. It will be apparent that since no electrical signal is received by the gate 125 through conductor 138, the oscillating voltage signal $C_1$ generated by transducer 16 immediately after it has been excited by the electrical pulse $B_1$ is precluded from passing therethrough thereby precluding a spurious response by the testing device 110.

After the gate 125 has precluded voltage signals from passing therethrough for a predetermined time, voltage signals C' and C'' representing the first and second echos or reflections are then allowed to pass. A suitable receiver or amplifier 142 is connected to the gate 125 through a conductor 144 for actuation by received electrical signals. The voltage signals $C_1$ received by the receiver 142 are amplified and shaped into spike pulses G' and G'', as shown by wave form $G_1$ in FIG. 6. The output of the amplifier 142, which is the electrical pulses G' and G'', is transmitted through a suitable conductor 146 to a gate 148. A means for translating the time difference between pulses G' and G'' into a number indicating the thickness dimension of the specimen 120 is provided and is generally designated in FIG. 5 by the reference character 149. This indicating means 149 includes the gate 148 which also receives an electrical signal, shown by wave form $H_1$ in FIG. 6, from the control oscillator 12 through conductor 150.

The electrical signal $A_1$ transmitted by oscillator 12 through conductor 113 is also received by a first flip-flop circuit 152. The "0" output signal of the flip-flop circuit 152, when reset by signal $A_1$, is transmitted through a suitable conductor 154 to the gate 148. The "0" output signal of flip-flop 152 is shown as wave form $I_1$ of FIG. 6. Since electrical signals must be received through conductors 146, 150 and 154 for a signal to be passed by the gate 148 it will be seen that the electrical signals $H_1$ and $I_1$ must be received by the gate 148 for the voltage signal G' from the receiver 142 to be passed. When this condition exists the voltage signal G' is passed by the gate 148.

An inverter 156, which may be a suitable amplifier, inverts the signal G' and transmits an electrical signal, shown by wave form J' in FIG. 6, through a suitable conductor 158 to trigger a second flip-flop circuit 160. The "1" output of the flip-flop circuit 160 is a signal, shown as wave form $K_1$ in FIG. 6, which is transmitted through a conductor 162 to a suitable gating circuit 164. The gate 164 must receive a positive signal from conductor 162 and conductor 166 before a signal is passed.

A suitable oscillator or signal generator 168 generates a train of constant amplitude pulses, shown by wave form $L_1$ in FIG. 6, which is impressed upon the gate 164 through the conductor 166 so that when a signal is received through conductor 162 a wave train of electrical pulses, shown by wave form $M_1$ in FIG. 6, is allowed to pass therethrough. The electrical pulses $L_1$ are shown for purposes of illustration as exaggerated square pulses, but it will be apparent that pulses having desired frequencies and other wave forms can be used. The frequency of the signal generated by the signal generator 168 may be varied.

The electrical signal $M_1$ passed by the gate 164 is transmitted through a suitable conductor 170 to a counter 172 for counting the pulsed signal $M_1$ for a period of time. Upon receiving the signal $M_1$ the counter 172 commences to count. The initiation of the counting by the counter 172 thus corresponds with the actuation of the receiver 142 by the first internal reflection received from the specimen 120. The output of the counter 172 is visually displayed as a number which will indicate the thickness dimension of the specimen 120. In a successful practice of this invention, a signal $M_1$ having a frequency of 11.6 megacycles will cause the counter 172 to read in hundredths of an inch. Accordingly, if the dimension were desired in thousandths the frequency of the signal $M_1$ produced by the signal generator 168 would be 116 megacycles. When a first portion 172a, which may be a decade counter, of the counter 172 has reached the limit of its counting, an electrical signal is then directed through a suitable conductor 174 to a second portion 172b, which may also be a decade counter, of the counter 172 which then commences counting.

When a succeeding reflection or second echo of ultrasonic energy is received by the transducer 16 and amplified into a spike pulse G'' by the amplifier 142, the flip-flop 160 is then triggered so that the electrical signal $K_1$ transmitted through conductor 162 goes to zero. This causes the electrical signal $M_1$ also to go to zero thereby causing the counter 172 to stop counting. Thus, the counter 172 is deenergized by the second actuation of the receiver 142 by the second internal reflection resulting from the initial pulse transmitted into the specimen 120. It will be apparent that errors in determining the thickness dimension of the specimen 120 which result from changes in coupling of the transducer 16 to the specimen are eliminated since the thickness dimension is determined by the time difference between the first and second internal reflections. These internal reflections traverse the same distance in the specimen 120. The visual output of the counter 172 then directly indicates the thickness dimension of the tested specimen in a number form.

When the second flip-flop 160 is triggered by the second pulsed voltage signal G'' from the amplifier 142, it then transmits an electrical signal from its "0" output, shown by wave form $N_1$ in FIG. 6, through a suitable conductor 176 to an adding circuit 178. In examining wave form $N_1$ it will be seen that when a first voltage signal G' was received from the amplifier 142 the flip-flop circuit 160 was triggered so that the output signal through conductor 176 went from a positive value to zero and remained there until the flip-flop 160 was again triggered by a succeeding voltage signal G''. At that time the voltage signal $N_1$ again returned to a positive value and a voltage signal, shown by wave form $O_1$, is passed by the adding circuit 178. The signal which is passed by circuit 178, in the present illustration, has a wave form $O_1$ which is the same as wave form $N_1$. However, as will be pointed out hereinafter this may not always hold true since the electrical signal $O_1$ may have other wave forms according to the signal passed by the adding circuit 178.

A suitable inverter 180 is interposed in conductor 182 which connects the adding circuit 178 to the flip-flop 152 for inverting the electrical signal $O_1$ passed by the adding circuit 178. The electrical signal transmitted by the inverter 180, shown in FIG. 6 as having a wave form $P_1$, triggers the first flip-flop circuit 152 so that the output thereof goes to zero. The circuit or device 110 then remains at rest until the control oscillator 12 again resets the flip-flop circuits 152 and 160 and counter 172 by means of a signal $A_1$ transmitted through conductor 113.

A means is provided for halting operation of the testing device 110 if the thicknes dimension being tested is beyond the range of the device 110. This means may comprise a conductor 184 connected to the second portion 172b of the counter 172 and to the adding circuit 178. Thus, when a time interval between successive reflections or echos is encountered which would indicate a thickness beyond the range of the device 110, a signal from the counter 172 will be transmitted through conductor 184 to the adding circuit 178 for precluding the triggering of flip-flop 152. Since signal $I_1$ has gone to zero the gate 148 is thereby precluded from passing a signal when, if ever, a subsequent signal $G''$ is received from the amplifier 142. Thus, the device 110 remains at an "at rest" position awaiting resetting by the control oscillator 12.

From the foregoing it will be apparent that the present invention provides a novel non-destructive measuring device for determining the thickness dimension of an object. This novel device uses the first internal reflection of a pulse transmitted into an object for energizing a counter which commences to count. The second or following internal reflection is used by the device to deenergize the counter and stop its counting at a decimal number which indicates the thickness dimension of the object in suitable units and which may be, for example, in inches. It is apparent that the invention substantially eliminates errors introduced by the coupling of the transducer to the tested object since the thickness dimension of the object depends only upon the time difference between the first and second internal reflections which traverse the same path in the object. This device quickly and clearly indicates the thickness dimension of an object by means of a numerical visual output. It is also apparent that the novel non-destructive thickness measuring device may be easily assembled of readily obtainable components and elements into a package which is readily portable for the testing of objects in various areas. Finally, it will be apparent that the present invention provides a novel non-destructive measuring device which is simple in construction, which may be economically manufactured and which has a long service life.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

I claim:

1. A device for measuring the thickness of a specimen having at least one exposed surface, comprising:
    a pulse generator;
    a transducer adapted to be placed in direct contact with the exposed surface of the specimen connected to the pulse generator and responsive to an electrical pulse received from the pulse generator for transmitting an ultrasonic pulse into the specimen, said transducer also being responsive to ultrasonic pulses reflected from the specimen for producing corresponding electrical pulses;
    a receiver connected to the pulse generator and the transducer for amplifying and differentiating electrical pulses received from both the pulse generator and the transducer;
    first and second flip-flop circuits, each of said flip-flop circuits having a "0" and "1" output, as well as trigger and reset input terminals, the "1" output of the first flip-flop circuit being connected to the trigger input of the second flip-flop circuit;
    a first AND gate connected to the "1" output of each of the flip-flop circuits;
    an inverter connected to the output of the first AND gate;
    a second AND gate connecting the output of the receiver and the output of the inverter to the trigger input terminal of the first flip-flop circuit for triggering said flip-flop circuit upon the occurrence of each electrical pulse received by the receiver when the output of the inverter is positive;
    a signal generator producing a wave train of successive pulses;
    a third AND gate connected to the signal generator and to the "0" output of the fiirst flip-flop circuit and to the "1" output of the second flip-flop circuit for transmission of the pulses from the signal generator between the second and third electrical pulses received by the receiver;
    a digital counter connected to the output of the third AND gate for counting the pulses produced by the signal generator between the times of occurrence of the second and third electrical pulses received by the receiver, said counter having a reset terminal; and
    a control generator connected to the pulse generator and to each of the reset terminals of the flip-flop circuits and the counter adapted to automatically actuate the pulse generator and simultaneously reset the flip-flop circuits and the counter at intervals spaced in time greater than the expected travel time of an ultrasonic pulse from the transducer through four times the expected thickness of the specimen being measured and back to the transducer to provide a plurality of successive thickness measurements at each inspection.

2. A device for measuring the thickness of a specimen having at least one exposed surface, comprising:
    a pulse generator;
    a transducer connected to the pulse generator for transmitting an ultrasonic pulse into the specimen in response to each electrical pulse received from the pulse generator and for converting each ultrasonic pulse reflected from the specimen to an electrical pulse;
    means forming a liquid column for coupling the transducer to the exposed surface of the specimen;
    a receiver connected to the pulse generator and the transducer for amplifying electrical pulses received from both the pulse generator and the transducer;
    first, second and third flip-flop circuits, each of said flip-flop circuits having a "0" and a "1" output as well as a trigger and a reset input terminal;
    conductors connecting the "1" output of the first flip-flop circuit to the trigger input of the second flip-flop circuit and the "1" output of the second flip-flop circuit to the trigger input of the third flip-flop circuit;
    a first AND gate connecting the output of the receiver and the "0" output of the third flip-flop circuit to the trigger input of the first flip-flop circuit for transmitting the electrical pulses from the receiver to the trigger input of the first flip-flop circuit when the "0" ouput of the third flip-flop circuit is positive;
    an inverter interposed in the connection of the first AND gate and the trigger input of the first flip-flop to change the state of the first flip-flop in response to the pulses transmitted through the first AND gate;

a signal generator producing a wave train of successive pulses;

a decade counter having a reset terminal;

a second AND gate connected to the signal generator, the counter and to the "1" outputs of the first and second flip-flop circuits for transmitting the output of the signal generator to the counter between the third and fourth pulses received by the receiver;

a control generator connected to the pulse generator and to the reset terminals of each of the flip-flop circuits and the counter for automatically resetting the flip-flop circuits and the counter and actuating the pulse generator a plurality of times during each inspection at intervals spaced in time greater than the expected travel time of an ultrasonic pulse from the transducer through the liquid column and through four times the expected thickness of the specimen and back through the liquid column to the transducer to provide a plurality of successive thickness measurements at each inspection.

3. A device for measuring the thickness of a specimen having at least one exposed surface, comprising:

a pulse generator;

a transducer for converting electrical pulses from the pulse generator to ultrasonic pulses and for converting reflected ultrasonic pulses to electrical pulses;

a liquid column coupling the transducer to the exposed surface of the specimen;

a digital counter responsive to successive pulses for counting the number of such pulses;

signal generator means for producing a wave train of successive pulses;

gate means connecting said signal generator means to said digital counter for controlling the time during which successive pulses are transmitted from said signal generator means to said digital counter;

a receiver;

an AND gate connecting the transducer to the receiver; and means connected to the pulse generator and the AND gate for closing the AND gate until after the occurrence of the electrical pulse produced by the transducer in response to the ultrasonic pulse reflected from the exposed surface of the specimen through said liquid column; and control circuit means connected to said gate means and to said receiver for opening said gate means only during the time interval between a pair of selected, successive reflected pulses, whereby said counter measures twice the travel time of an ultrasonic pulse through the specimen, thereby indicating the thickness of the specimen.

4. A device for measuring the thickness of a specimen having at least one exposed surface, comprising:

means for transmitting an ultrasonic pulse-type signal into the specimen through the exposed surface of the specimen and for receiving pulses reflected through the specimen to said exposed surface;

digital counter responsive to successive pulses for timing the number of such pulses;

signal generator means for producing a wave train of successive pulses;

gate means having first and second enabling inputs connecting said signal generator means to said digital counter for controlling the time during which successive pulses are transmitted from said signal generator means to said counter;

first bi-stable means connected to said gate means first input and to said means for receiving reflected pulses for providing a first enabling pulse to said gate means during a time interval between a selected pair of successive, reflected pulses;

second bi-stable circuit means connected to said gate means second input and to be triggered by an output of said first bi-stable circuit means to provide a second enabling pulse to said gate means upon the occurrence of the first one of said pair of selected, reflected pulses to allow conduction of said successive pulses to said digital counter;

said first and second bi-stable circuit means and said digital counter each having a reset input terminal; and a control generator connected to the reset terminals of the first and second bi-stable circuit means and the digital counter for automatically resetting the first and second bi-stable circuit means and digital counter and for actuating said means for transmitting a plurality of times at intervals spaced in time greater than the expected travel time of an ultrasonic pulse from the transducer through four times the expected thickness of the specimen and back to the transducer to provide a plurality of successive thickness measurements at each inspection.

References Cited

UNITED STATES PATENTS

| | | | |
|---|---|---|---|
| 2,433,385 | 12/1947 | Miller | 324—68 |
| 3,169,393 | 2/1965 | Stebbins | 73—67.9 |

FOREIGN PATENTS 829,741  3/1960  Great Britain.

OTHER REFERENCES

Goldman, Richard: Ultrasonic Technology. Reinhold Publishing Corp., New York, 1962, pages 238–240 and pages 266–267.

Hashmi, S. Z. R. et al.: Application of Counter-Chronograph Techniques to Measurement of Sonic Velocities, The Journal of The Acoustical Society of America, vol. 31, No. 10, October 1959, page 1384.

JAMES J. GILL, *Acting Primary Examiner.*

J. P. BEAUCHAMP, R. C. QUEISSER,
*Assistant Examiners.*